US011191388B2

United States Patent
Asshauer et al.

(10) Patent No.: US 11,191,388 B2
(45) Date of Patent: Dec. 7, 2021

(54) APPARATUS FOR REGULATING THE TEMPERATURE OF A GRILL, IN PARTICULAR A GAS GRILL

(71) Applicant: examedia GmbH, Cologne (DE)

(72) Inventors: Klaus Asshauer, Radolfzell (DE); Rolf Hilzinger, Schaffhausen (CH)

(73) Assignee: examedia GmbH, Cologne (DE)

( * ) Notice: Subject to any disclaimer, the term of this patent is extended or adjusted under 35 U.S.C. 154(b) by 210 days.

(21) Appl. No.: 16/527,472

(22) Filed: Jul. 31, 2019

(65) Prior Publication Data

US 2020/0037818 A1 Feb. 6, 2020

(30) Foreign Application Priority Data

Aug. 2, 2018 (DE) ...................... 10 2018 118 850.1

(51) Int. Cl.
*A47J 36/32* (2006.01)
*A47J 37/07* (2006.01)
*F23N 1/00* (2006.01)

(52) U.S. Cl.
CPC ......... *A47J 37/0713* (2013.01); *A47J 36/321* (2018.08); *F23N 1/005* (2013.01)

(58) Field of Classification Search
CPC ...... A47J 37/0713; A47J 36/321; F23N 1/005
USPC .......................................... 431/72; 126/25 R
See application file for complete search history.

(56) References Cited

U.S. PATENT DOCUMENTS

| 5,429,111 | A  | * | 7/1995 | Akamatsu ............... F23N 5/265 126/52 |
| 6,255,628 | B1 | * | 7/2001 | Perrino ................... F24C 3/085 126/39 J |
| 6,289,792 | B1 | * | 9/2001 | Grando ................ A47J 37/0713 126/25 R |
| 6,922,033 | B2 | * | 7/2005 | Ziegenhorn ......... A47J 37/0704 318/445 |
| 8,800,542 | B1 | * | 8/2014 | Kennington ........ A47J 37/0786 126/25 B |
| 10,158,720 | B2 | * | 12/2018 | Colston ................ G08B 21/185 |
| 2009/0104573 | A1 | * | 4/2009 | Chen ....................... F24C 3/103 431/72 |

(Continued)

FOREIGN PATENT DOCUMENTS

DE   10 2011 002 853 A1   9/2011

OTHER PUBLICATIONS

German Search Report dated Mar. 26, 2019 in German Application No. 10 2018 118 850.1 with English translation of relevant parts.

(Continued)

*Primary Examiner* — Avinash A Savani

(74) *Attorney, Agent, or Firm* — Collard & Roe, P.C.

(57) ABSTRACT

An apparatus for regulating the temperature of a grill is disposed between a supply unit for gas and a gas outlet unit, which is part of the grill and is used for grilling the food, wherein the apparatus includes a control element for regulating the gas using a gas outlet regulator, which can generally be operated by hand. The apparatus includes at least one electronic regulation element, a regulation unit, as well as at least one sensor, wherein the regulation element includes a holding element and a transmitter element, wherein the holding element can be coupled with the mechanical control element of the grill, and the transmitter element, and thereby the mechanical control element, is adjustable as a function of the variable that is determined by the regulation unit.

8 Claims, 2 Drawing Sheets

(56) References Cited

U.S. PATENT DOCUMENTS

Figure 1:
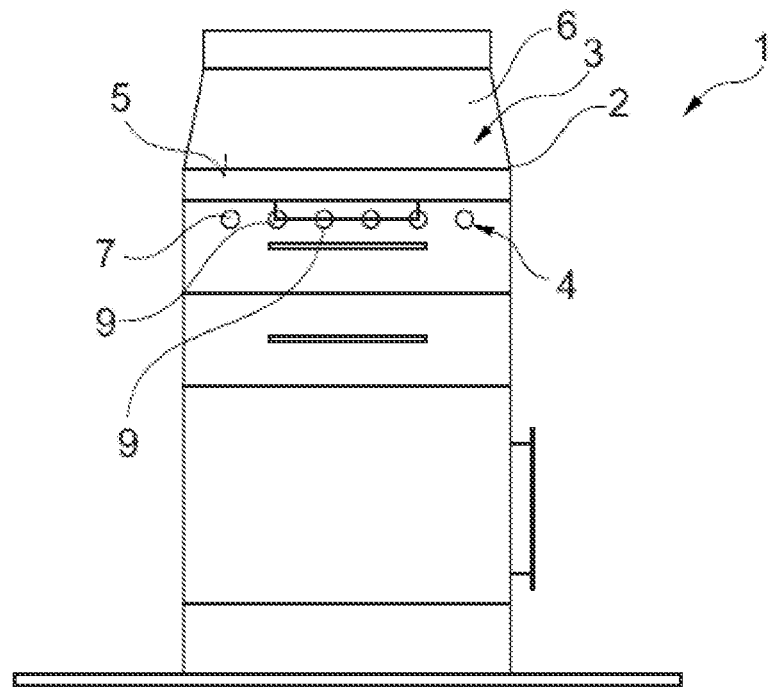

| | | | |
|---|---|---|---|
| 2014/0037804 A1* | 2/2014 | Huang | A47J 37/0647 |
| | | | 426/231 |
| 2014/0261006 A1 | 9/2014 | Huang et al. | |
| 2018/0008095 A1 | 1/2018 | Bennett et al. | |
| 2018/0271324 A1* | 9/2018 | Arnold | A47J 37/0713 |

OTHER PUBLICATIONS

Anleitung Tripod—(Instruction Tripod) Stand Nov. 26, 2017 (https://www.grillsportverein.de/forum/attachments/anleitung-tripod-stand-26-11-2017-pdf.1618971/), total of 16 pages.
You Tube Video, Grill Control Tutorial Master, https://youtube/BnLtL89Yris, May 7, 2021, 52 pages of screenshots.
Anonymous, "Anleitung Tripod—Stand", grillsportverein, (Nov. 26, 2017), URL: https://www.grillsportverein.de/forum/attachments/anleitung-tripod-stand-26-11-2017-pdf.1618971, (Sep. 3, 2019), 30 pages.

* cited by examiner

APPARATUS FOR REGULATING THE TEMPERATURE OF A GRILL, IN PARTICULAR A GAS GRILL

CROSS REFERENCE TO RELATED APPLICATIONS

Applicant claims priority under 35 U.S.C. § 119 of German Application No. 10 2018 118 850.1 filed Aug. 2, 2018, the disclosure of which is incorporated by reference.

TECHNICAL FIELD

The invention relates to an apparatus for regulating the temperature of a grill, which apparatus is disposed between a heat supply unit and a unit for emitting heat, which unit is part of the grill and is used for grilling the food, wherein the apparatus comprises a control element for regulating the amount of heat, which element can generally be operated manually.

DEFINITIONS

The term "control" means to influence an apparatus or system, using a setting variable. Regulation is a process during which the actual value of a variable is measured and made to approach the reference value, using a defined control variable.

During grilling, the food to be cooked is cooked essentially by means of heat radiation, and browned on the surface. For this purpose, it is held above, next to or under a radiating heat source, either using a spit or on a grilling grate. Wood fires or wood embers, gas, stones heated by means of gas or electrical heating loops serve as a heat source. The heat source gives off a certain power so as to bring about the grilling process here. This power can be controlled by means of mechanical control elements that can be operated manually. In this regard, in the case of a gas grill the amount of gas is controlled; in the case of a grill operated with electricity, the amount of electricity is controlled. The control elements are rotary knobs or sliding knobs.

STATE OF THE ART

Devices for outdoor use have been used for a long time for preparing foods and for carrying out other tasks. For example, devices for outdoor use, such as grills and smoker grills (barbecue smokers) are often used for preparing meat, vegetables, fruit and other types of foods. These grills and smoker grills are typically operated using manual control elements that can be operated mechanically (by hand) and are integrated into the frame of the grill or smoker grill. Thus, for example, many such devices for outdoor use have an ignition button that generates a spark in the vicinity of a gas outlet on a burner (unit for emitting heat) when pressed. In this regard, a gas cylinder is used as a heat supply unit; the gas flows from the cylinder to the unit for emitting heat, by way of the control element. The spark ignites the gas and the burner begins to generate heat. The amount of heat is generally controlled by means of a rotary disk or a rotary knob, which allows more or less gas to flow into the burner.

In some cases, such grill apparatuses can also have electronic control elements. Instead of these apparatuses having a manual rotary disk or a rotary knob for adjusting the amount of gas supplied to the burner, an electronic controller is set or adjusted by the user. The electronic controller then interacts with a magnetic coil or another electromechanical component to regulate the gas flow to the burner. Nevertheless, the user must still remain by the grill so as to change settings on the grill, as is the case for manual rotary disks or rotary knobs. In order to solve this problem, some devices produced recently for outdoor use were equipped with Bluetooth wireless devices. These Bluetooth wireless devices allow communication with electronic devices spatially close to them, including cell phones or tablet PCs of the device owner. Furthermore, the device has very restricted options, even when it is connected with a mobile device. In fact, the device has no access to data or control signals beyond the mobile device of the user.

Furthermore, in general only one device can be coupled with a Bluetooth-operated device, in each instance.

An apparatus for adjusting a control element of a gas grill is known from https://www.grillsportverein.de/forum/attachments/anleitung-tripod-stand-26-11-2017-pdf.1618971/ (status Nov. 26, 2017). For this purpose, the control element must be removed and the apparatus must be affixed. An integrated actuator motor can take over control by way of a control unit.

The apparatus that is disclosed in DE 10 2011 002 853 A1 proceeds from a cooking device apparatus having at least one control and/or regulation unit and at least one cooking unit, which has at least one direct contact surface for having food to be cooked placed on it, and which is provided for open cooking of food to be cooked. In order to achieve low energy consumption, it is proposed that the control and/or regulation unit is provided for the purpose of automatically activating at least one power-reduced heating mode after an idle operation heating phase.

In US 2014/0261006 A1, a gas grill is described. This temperature-controllable gas grill comprises a main body having a grill chamber, multiple burners in the main body for combustion of gas, a temperature sensor for detecting the current temperature in the grill chamber, a gas valve, and a controller. The gas valve has a slide and a stepper motor, and the stepper motor moves the slide so as to change a gas stream that is supplied to the burners. The controller has a user interface and a processing unit. The user enters a setting temperature by way of the user interface, and the processing unit controls the stepper motor in accordance with the current temperature and the setting temperature, so as to keep the current temperature in the grill chamber within a limited range.

DISADVANTAGES OF THE STATE OF THE ART

Grill apparatuses having a hood additionally have a temperature measurement device. This is a thermometer, the measurement sensors of which determine the current temperature in the interior of the hood. The temperature of the interior of the grill is displayed by means of this temperature measurement device.

This temperature must be analyzed by the user. If it is too high, the amount of heat must be adjusted by way of the control elements, so that this temperature can be changed accordingly.

If the user is at a slight spatial distance from the grill, he/she can no longer check the temperature and then has no possibility of intervening if the temperature changes unintentionally. During the starting phase, in particular, precise observation and then also corresponding adjustment are required.

In this regard, the danger exists that the food to be grilled will be overheated, burned or otherwise damaged, so that it becomes inedible.

Previous electrically operable control elements must be installed by the manufacturer during production, since they intervene directly in the gas circuit. For reasons of safety technology, the user is not allowed to become active here, in this regard. If the user changes the rotary knob or gas feed, permission to operate the grill and its warranty are voided.

TASK OF THE INVENTION

It is the task of the invention to make available an apparatus with which regulation of the amount of heat within a grill, in particular one operated with gas, can be created in simple manner.

SOLUTION OF THE TASK

The solution of the task is characterized by the characteristics according to the invention.

ADVANTAGES OF THE INVENTION

The basic idea of the invention is to configure an existing grill, which is preferably operated with gas and has a hood, with an apparatus at least for controlling the feed of the amount of heat. Furthermore, it is provided that regulation takes place automatically, as a function of the set, intended temperature and of the actual temperature under the hood.

For this reason, at least one regulation element is provided, according to the invention, which element can be set onto the mechanical control element for controlling the amount of heat or power on the grill, wherein the regulation element has an actuator motor that is coupled by way of a regulation unit. Likewise, at least one sensor is coupled with the regulation unit or the regulation element, which sensor measures the actual temperature within the hood and compares it with a pre-set temperature value.

A further development provides that different temperature/time progressions are stored in the memory of the regulation unit.

These progressions serve to make it simple for the user to cook or grill the food to be grilled. In this way, what are called "smoke" processes are also possible, without constant observation and measuring being required. The regulation unit comprises an external processing unit, by means of which the different temperature/time progressions can be selected.

A further development provides that a regulation element, in each instance, is set onto the mechanical control element, and that the regulation element is then controlled accordingly by the regulation unit.

In order to guarantee simple installation, a panel having a flat configuration is passed over the mechanical control elements and preferably attached to the grill—by way of magnets or other means having a similar effect. This panel comprises the identification of the control elements as well as the electronic regulation unit and a display. Furthermore, plug-in contacts for sensors and the electronic control elements are present.

The regulation unit, and also the respective regulation element, has the advantage that it has the property of accommodating additional sensors. Thus, for example, a sensor can be used for determining the doneness point of a piece of meat to be grilled.

Further developments also provide for the use of a timer, which regulates the temperature accordingly after a defined period of time or shuts off the heat feed. This can also be an integral part of the panel.

By means of the panel, a single component can be affixed to the grill, so that simple and safe handling is guaranteed.

The significant advantage of the apparatus according to the invention consists in that automatic regulation of the heat feed can take place, without intervening in the mechanical or electronic elements of a grill. By means of simply setting the electronic regulation elements onto the mechanical control elements, the existing system of the grill does not need to be changed. This also means that possible safety regulations, provisions of intended use or also legal regulations of the grill apparatuses that are commercially available do not need to be changed. For example in the case of grill apparatuses that are operated with gas, the apparatus according to the invention does not intervene in the gas feed. It is not necessary to change the gas feed, to affix different connectors or even to intervene in the gas stream. The operating license of the apparatus is maintained without any change.

The apparatus according to the invention is suitable for all types of grill apparatuses that have mechanical rotary knobs on the grill for controlling the amount of heat or power, independent of what type of energy (gas, electricity) is used to operate the grill apparatus.

The individual electrical regulation elements can either be operated with a battery, or they can be supplied with electricity by way of the regulation unit. This also holds true for the regulation unit and the display.

The regulation unit furthermore offers the possibility that data are transmitted to a wireless device or tablet by way of usual data transmission techniques. Thus, the user can constantly learn of the status of his/her grill apparatus, independent of where he/she is situated. Furthermore, the possibility exists to also undertake regulation by way of a wireless device or tablet.

A further development provides that the processing unit is part of the tablet PC or the smart phone, and that this process runs as part of an application. In this way, the temperature/time curves stored in memory, with which the regulation elements are controlled, in each instance, can be selected or stored in memory. In a community, it is also possible to exchange the temperature/time curves that have been created by the users, so that in this way, experience regarding grilling of the food to be grilled can be exchanged.

Further advantageous embodiments are evident from the following description, the claims, as well as the drawings.

DRAWINGS

Figure 2:
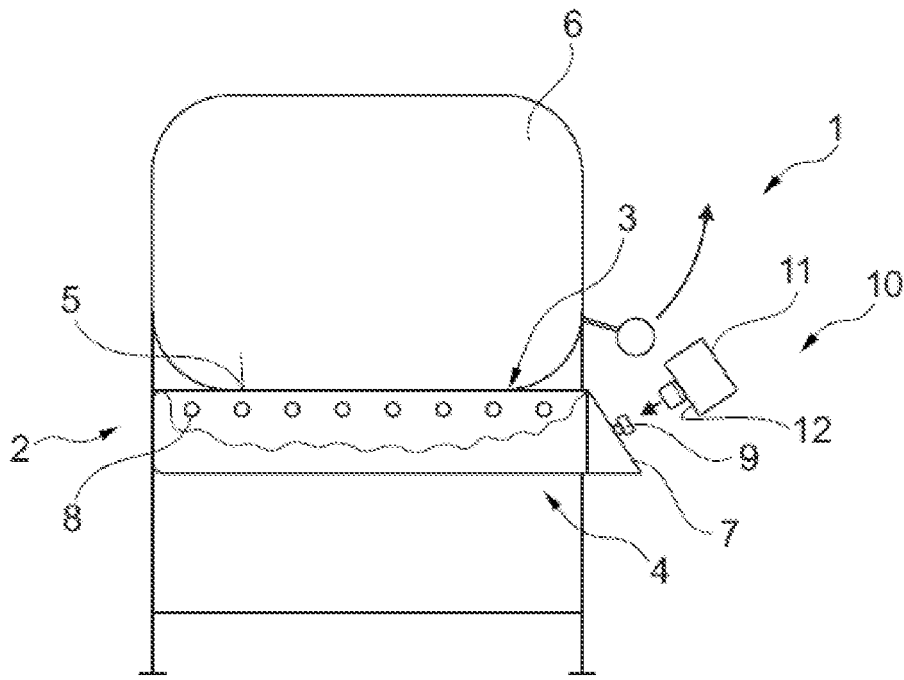
Figure 3:
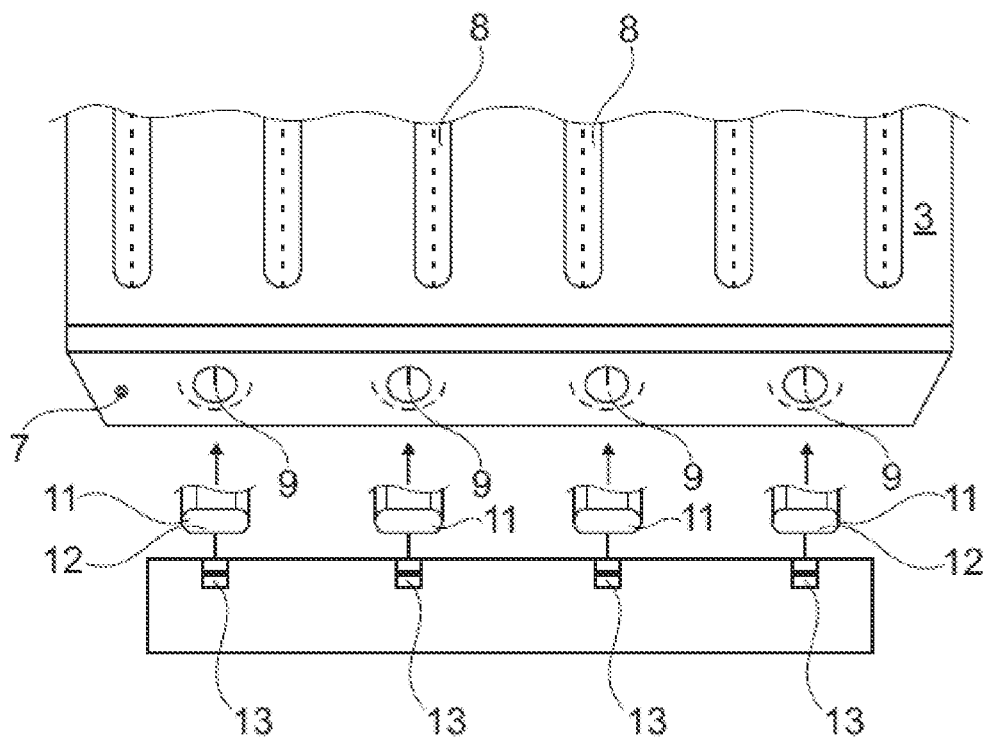
Figure 4:
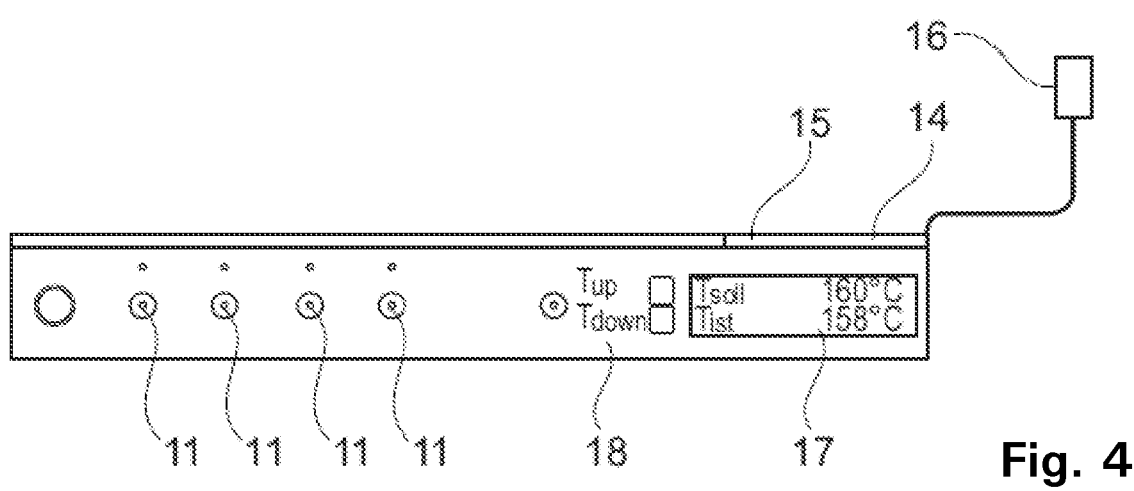

These show:

FIG. 1 a view of a commercially available grill having mechanical control elements and the apparatus according to the invention;

FIG. 2 a further view of the grill according to FIG. 1;

FIG. 3 a schematic view of an electronic regulation element of the apparatus according to the invention;

FIG. 4 a view of a schematic representation of the panel, with the regulation elements and the regulation unit, as well as a display.

DESCRIPTION OF AN EXEMPLARY EMBODIMENT

The apparatus 10 can be used for a grill 1, which can generally be used outdoors.

Such a grill 1 is shown in FIGS. 1 and 2. It consists of a housing 2 having a top side 3 and an underside 4. A grill surface 5 is present on the top side 3; the food to be cooked is laid onto this surface. A hood 6 is provided facing the top side 3 and articulated onto one side of the top side 3, which hood forms a cavity in the closed state, facing the top side. This hood 6 ends flush with the top side 3.

A spark is generated in the vicinity of a gas outlet on a burner 8 by pressing an ignition button 7. The spark ignites the gas and the burner 8 begins to generate heat. The food to be grilled is heated using this heat. The amount of heat is generally controlled by means of a rotary disk or a rotary knob in the configuration of a mechanical control element 9, which allows more or less gas to flow into the burner.

The apparatus 10 according to the invention now comprises a total of four regulation elements 11 in the exemplary embodiment presented here, as shown in FIGS. 2 and 3. These regulation elements 11 are set onto the respective rotary knob (mechanical control element 9).

Such a regulation element 11 consists of a holding element 12 and a transmitter element 13. The holder element 12 preferably has a cylindrical configuration and can be structured in such a manner that the cylindrical configuration is set onto the rotary knob (mechanical control element 9) of the grill in torque-proof manner. By means of the corresponding configuration in the interior of the holding element, preferably torque-proof coupling is only possible by means of setting it on. For this purpose, crosspieces in the interior of the holding element 12 engage around the handle element of the rotary knob (mechanical control element 9).

The holding element 12 is coupled with the transmitter element 13. This transmitter element 13 is a servomotor or actuator motor, which is controlled by a regulation unit 14.

The regulation unit 14 is an electronic circuit 15, which has the property that here, for one thing, the transmitter element 13 is controlled, and for another thing, the values that the sensors 16 that are coupled with the regulation element 11 make available are also processed there accordingly. Thus, the desired temperature can be predetermined by way of an input field. This temperature is displayed on a display 18. The regulation unit 14 constantly checks whether or not the desired temperature has been reached, in that it reads out the data of the sensor. If the temperature has not been reached, the amount of heat is optionally maintained or increased until the desired temperature has been reached. This is done in that the regulation unit predetermines the number of angular degrees by which the transmitter element is supposed to adjust in a clockwise or counterclockwise direction. Then the rotary knob of the grill is adjusted accordingly, by the same value, by means of the coupling with the holding element 12.

The transmitter elements 13 can be servomotors or stepper motors 13 or means that have a similar effect. Even small rotations can be implemented accordingly, using these means.

In order to allow easy installation, the panel 17 is provided, which is affixed to the grill in that it is placed over the existing rotary knobs (mechanical control elements 9). This panel 17 is attached by means of magnets or other means that have a similar effect. If parts of the grill are not magnetic, attachments means such as tensioning elements, tensioning belts, adhesive strips or similar means can also be provided.

The electronic regulation elements 11 are already provided on the panel 17. These elements then enter into a connection with the rotary knobs, in that the respective holding element 12 is placed over the existing rotary knob and enters into a torque-proof connection with it, wherein at the same time, the panel 17 enters into a connection, preferably a releasable connection, with the grill 1. Because of the configuration as a unit, very easy installation is possible.

REFERENCE SYMBOL LIST 1 grill
2 housing
3 top side
4 underside
5 grill surface
6 hood
7 ignition button
8 burner
9 control element
10 apparatus
11 regulation element
12 holding element
13 transmitter element
14 regulation unit
15 electric circuit
16 sensors
17 panel
18 display

The invention claimed is:

1. An apparatus for actively adjusting at least one mechanical control element provided on a grill for regulating the amount of power to be given off, wherein the apparatus comprises a regulation element that comprises a holding element and a transmitter element, wherein
   a. a regulation unit (14) coupled with the regulation element (11) is provided, and the regulation unit (14) or the regulation element (11) comprises at least one sensor (16) coupled with this unit,
   b. the regulation unit (14) comprises an external processing unit, by means of which different temperature/time progressions can be selected, and
   c. the holding element (12) of the regulation element (11) has fixation elements for holding the mechanical control element of the grill and attachment to the grill, the holding element having a cylindrical formation adapted to be fitted in a rotationally fixed manner onto the at least one mechanical control element of the grill for mechanically adjusting the at least one mechanical control element as a function of a variable determined by the regulation unit to control the feed of the power to be given off.

2. The apparatus according to claim 1, wherein the external processing unit is an application that can run on a tablet PC or smart phone.

3. The apparatus according to claim 1, wherein a regulation element (11) has means for a master function, wherein one or more further regulation elements (11) have means for a slave function dependent on the master function.

4. The apparatus according to claim 1, wherein the sensor (16) is connected with the regulation element (11) in hardwired manner.

5. The apparatus according to claim 4, wherein the sensor (16) is a platinum measurement resistor.

6. The apparatus according to claim 1, wherein at least one regulation element (11) is disposed on a panel (17), which in turn has means for attachment to the grill.

7. The apparatus according to claim 6, wherein the panel (17) has a display (18).

8. The apparatus according to claim 1, wherein the transmitter element (13) is a servomotor or actuator motor.

\* \* \* \* \*